United States Patent

Krebs

[15] 3,673,390

[45] June 27, 1972

[54] PULSE COUNTERS

[72] Inventor: Peter Eric Krebs, Farnborough, England

[73] Assignee: The Solartron Electronic Group Limited, Farnborough, England

[22] Filed: Nov. 16, 1970

[21] Appl. No.: 89,581

[30] Foreign Application Priority Data

Dec. 1, 1969 Great Britain ......................58,624/69

[52] U.S. Cl. ....................235/92 SH, 235/92 R, 235/92 NG, 307/221, 328/37

[51] Int. Cl. ....................................H03k 21/16, H03k 27/00

[58] Field of Search .........235/91 NG, 92 SA, 92 EA, 92 CC; 307/221, 223; 328/37, 43

[56] References Cited

UNITED STATES PATENTS

| | | | |
|---|---|---|---|
| 3,056,044 | 9/1962 | Kroos | 307/221 R |
| 3,274,566 | 9/1966 | McGrogan | 328/37 |
| 3,581,065 | 5/1971 | Hatsukano | 235/92 R |
| 2,820,153 | 1/1958 | Woll | 307/223 R |
| 3,408,577 | 10/1968 | Ehret | 307/223 R |
| 3,594,765 | 7/1971 | Le Rouge | 235/92 SH |

*Primary Examiner*—Maynard R. Wilbur

*Assistant Examiner*—Robert F. Gnuse

*Attorney*—William R. Sherman, Stewart F. Moore and Jerry M. Presson

[57] ABSTRACT

A pulse counter has stages (such as decade stages) formed from binary circuits and preferably each based on a shift register. In the invention the binary circuits are reconnected in one large shift register whereby the digits can be shifted through the register to pass through one stage in turn, whereat they are read out in turn.

7 Claims, 1 Drawing Figure

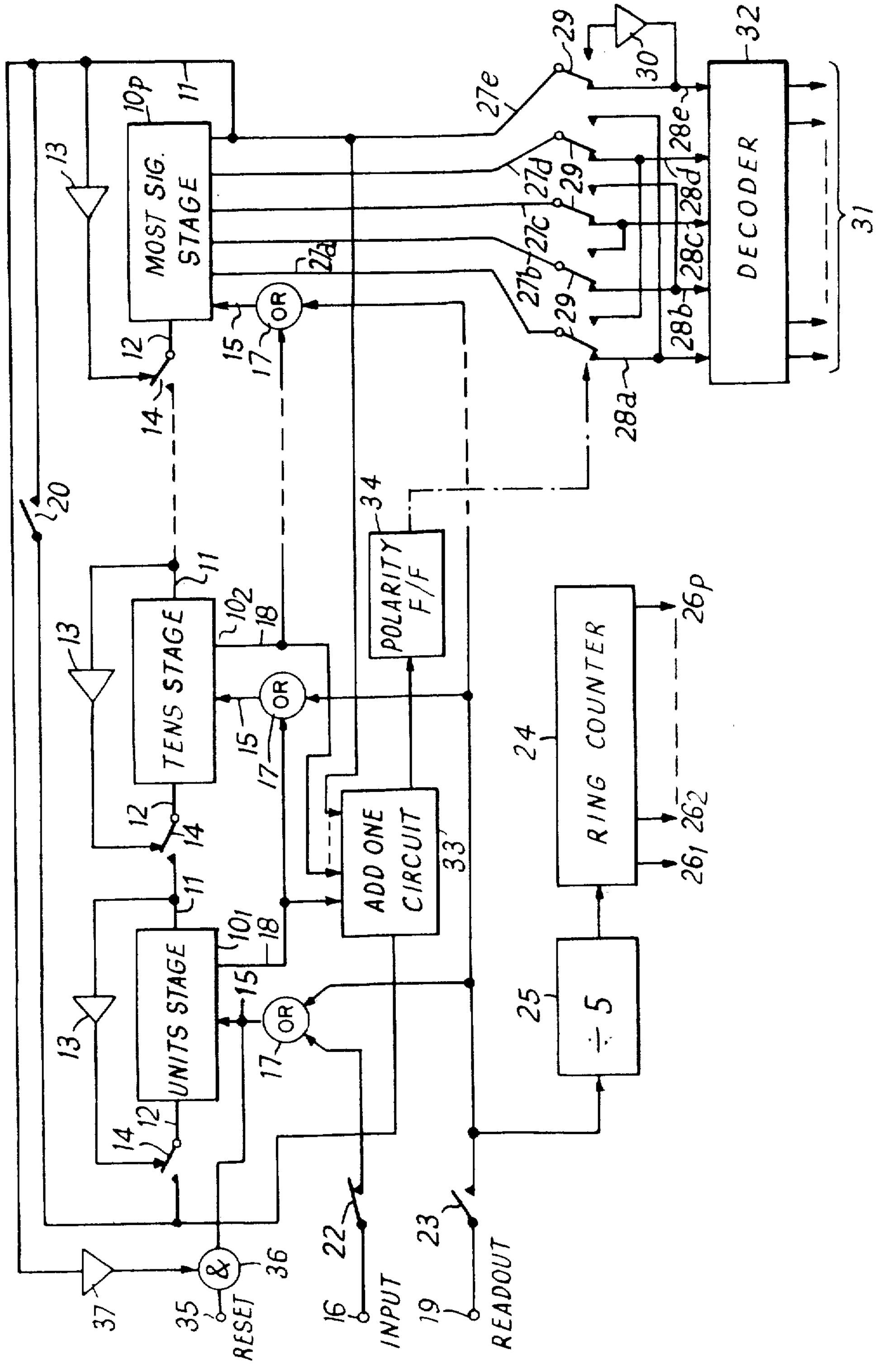
MOST SIG. STAGE
TENS STAGE
UNITS STAGE
ADD ONE CIRCUIT
POLARITY F/F
RING COUNTER
÷ 5
DECODER
OR
&
RESET
INPUT
READOUT

PULSE COUNTERS

This invention relates to pulse counters and concerns systems which can be used to provide dynamic readout from multistage counters and also for purposes of calculation. A multistage counter is a counter with a number of cascaded stages, such as decade stages, each of which counts one digit in a number system of radix $n$ where $n$ is greater than 2 and is ordinarily 10. Each counter stage consists of a plurality of binary stages which will, however, be called binary circuits to avoid confusion with the counter stages. Another distinction preserved throughout the specification is that the expression "digit" always refers to a digit in the system of radix $n$. It never refers to a bit.

Dynamic readout refers to a readout system which operates on a time-shared basis to economize on components and essentially involves the provision of a data highway which serves all stages and can carry one digit only and position lines which identify the counter stages respectively. If readout is on to neon indicator tubes the data highway will have $n$ lines, one for each digit value, each of which will be connected to the corresponding cathode of every neon tube, while the position lines will be connected individually to the anodes of the respective tubes. The invention is not, of course, restricted to this kind of readout; in its broadest sense readout merely refers to the transfer of the data in the counter to some other device, e.g. a display device, a printer, a computer or another counter or register.

Two different kinds of dynamic readout system are known. In one, which may be referred to as the digit scan system, all stages of the counter are cycled simultaneously and the digit on the data highway is also cycled. When any stage of the counter passes through a predetermined state (e.g. 9 when the stages are decade stages) a signal is placed on the corresponding position line, thus showing that the current digit value on the data highway is applicable to the stage pertaining thereto. The digit scan system is simple to engineer but suffers from several disadvantages. Except for large counters (more than 10 stages) the duty cycle on the position lines is poor compared with the "stage scan" system described below. More than one position line will often be energized simultaneously, (indeed all will be energized simultaneously whenever the digits of the number in the counter are all the same), imposing severe and fluctuating demands upon the system in supplying drive current, e.g. to neon indicator tubes.

In the stage scan system the stages are effectively scanned in sequence. The position lines are accordingly energized in sequence (avoiding fluctuating drive current demands) and, while each is energized, the digit for the corresponding stage is caused to appear on the data highway. The object of this invention is to provide a counter system which can be used as an improved stage scan dynamic readout system. This readout system is relatively simple and yet is particularly suited to providing center zero readout, i.e. when readout of a pulse count in the range O to N is required to be translated to a number in the range –N/2 to N/2, as when the counter supplies the digital output of a digital voltmeter for example. However this is not the only use to which the invention can be put.

The present invention provides a multi-stage counter, comprising a plurality p of cascaded stages, each of which counts one digit in a number system of radix $n$ where $n$ is greater than 2, each counter stage consisting of a plurality $m$ of binary circuits, and a gating arrangement operative to switch the configuration of the binary circuits from that composing the multi-stage counter to that of a binary shift register comprising the binary circuits, means for applying shift pulses to the shift register stages and operative, in response to successive groups of $m$ shift pulses, to shift the counted digits through the said stages, means for effecting dynamic readout of the digits connected to one stage to read out the digits as they are shifted one by one into this one stage.

As already indicated, one use of the invention is for performing calculations. Each group of $m$ pulses shifts the digits by one place and thus multiplies or divides the number by $n$, depending upon the direction of shift. If it is desired to preserve all the digits, the shift register can be connected as a recirculating register. After $p \cdot m$ shift pulses the number exists in the counter as it was before the configuration was switched to that of a shift register.

The particular stage of the counter in which the digits are shifted in succession can be the most significant stage, for example, and the digits presented in this stage are read out in succession and can also be modified for the purposes of calculation. However it may simply be arranged to transfer the digits one at a time to other apparatus, e.g. for effecting dynamic readout. The digits of different significance are identified by the order in which they appear in the particular stage but it will usually be desirable to identify the digits by position lines, as in the prior art mentioned above. To this end there can also be provided a position counter adapted to count down the shift pulses by a factor of $m$ and to energize $p$ position lines in succession in response to the successive groups of $m$ pulses. The position counter conveniently comprises a $p$-stage ring counter preceded by a divide-by-$m$ circuit. The readout pulses can occur as a uniform train, in which case the groups of $m$ are only identified operatively within the system, but it may be desirable actually to group the pulses in a succession of bursts of $m$ pulses each.

The invention is most readily applicable if the counter stages already comprise individual shift registers, since the only switching which has to be performed by the gating arrangement is at the inputs and outputs of the stages. An example is described in detail below in which the stages are decade stages ($n = 10$) composed of five-bit shift registers ($m = 5$) connected in the well known Johnson ring configuration for counting. It will be shown how complements of numbers can easily be read out in order to obtain center zero readout.

An embodiment of the invention will now be described in more detail, by way of example, with reference to the accompanying drawing in which the sole FIGURE is a block schematic diagram of the embodiment.

The illustrated embodiment employs switched configuration shift registers and for convenience the switching is shown effected by electromechanical switches. It will be obvious to those skilled in the art that logical circuits would be employed in practice and in fact the complete counter and readout system can be constructed in integrated circuit form. The details of the logic can obviously be modified to fit in best with integrated circuit design requirements.

The counter in FIG. 1 comprises $p$ decade stages $10_1$, $10_2$ to $10_p$. The subscripts 1 to $p$ are only used when necessary to distinguish stages. Each stage 10 consists of a five-bit shift register whose output 11 is connected back to its input 12 through an inverter 13 and a changeover switch 14. In the illustrated position of the switches 14 each counter stage is thus a conventional Johnson ring and, when pulses are applied to the clock input 15 of a register it cycles through the states identified in the following table:

| Pulse count | Register state | 9's Complement state |
|---|---|---|
| 1 | 10000 | 00011 |
| 2 | 11000 | 00111 |
| 3 | 11100 | 01111 |
| 4 | 11110 | 11111 |
| 5 | 11111 | 11110 |
| 6 | 01111 | 11100 |
| 7 | 00111 | 11000 |
| 8 | 00011 | 10000 |
| 9 | 00001 | 00000 |
| 0 | 00000 | 00001 |

In use as a counter, the input pulses are applied to a terminal 16 which is connected to the clock input 15 of stage $10_1$ through an OR gate 17. The stage $10_1$ has a 9-recognition output 18 which is connected to the clock input 15 of the stage $10_2$ through another OR gate 17 so that, every time the stage $10_1$ passes from a pulse count of 9 to 0, a pulse is applied to the clock input of stage $10_2$ to carry a digit. The stages are similarly cascaded in succession up to the most significant stage $10_p$, this arrangement being entirely conventional, and thus not described in any more detail.

When the switches 14 are changed over, it will be seen that each Johnson ring is broken and instead and five-bit shift registers are connected together to form one large shift register (with $5p$ bits). For the purposes of effecting calculation or dynamic readout, shift pulses are applied to a terminal 19, preferably as bursts of 5 pulses with an interval between. The terminal 19 is connected to all the OR gates 17 and accordingly the first 5 readout pulses shift the digit in stage $10_{p-1}$ into stage $10_p$, the next 5 readout pulses shift the digit originally in stage $10_{p-2}$ into stage $10_p$, and so on. If non-destructive readout is required a switch 20 is closed when the switches 14 change over and when the switch 20 is closed, the output 11 of the stage $10_p$ is connected to the input 12 of the stage $10_1$. After $P . m$ ($m = 5$ in this embodiment) readout pulses, the count will re-exist in the counter, as before readout was commenced.

Other switches 22 and 23 can be connected to the terminals 16 and 19 and arranged to operate simultaneously with the switches 14 to prevent the application of readout pulses in the count mode and the application of count pulses in the readout mode.

If it is required to mark the decade whose contents are currently in the stage $10_p$ the readout pulses are also applied to a $p$ stage ring counter 24 through a divide-by-5 circuit 25, the stages of the ring counter being connected to position lines $26_p$, $26_{p-1}$ . . . $26_1$. It can be arranged to reset the counter to mark the $p$th stage when the switches 14 are changed over. The counter 24 is not essential however. The various decimal digits are identified by the order in which they appear in the stage $10_p$.

For dynamic readout purposes, the output from the stage $10_p$ is by way of five lines 27*a* to 27*e* connected to the five binary circuits respectively of the stage $10_p$ and carrying the five bits respectively of the Johnson code. A complemented output is readily obtained, as will be apparent from the table above, by interchanging the first and fourth bits of the code, interchanging the second and third bits and inverting the fifth bit. Accordingly the data highway 27 is connected to another data highway 28 through switches 29 and an inverter 30. When the switches 29 are set as shown the true digit appears on the highway 28; when the switches are all changed over, the 9's complement digit appears on the highway 28.

The highway 28 is connected to a ten line highway 31 through a decoder 32 which decodes Johnson code into 1-out-of-10. The highway 31 could, for example, be connected to the cathodes of $p$ neon indicator tubes in common, in which case the lines 26 are connected to the anodes respectively of the tubes.

In order to obtain a center zero readout, the counter $10_1$ to $10_p$ can initially be set to N/2, where N=10p, a circuit 33 being provided to detect all 9's in the stages 10, and responsive thereto to add one pulse to shift the counter to all zero's. The counter counts upwardly only, and, so long as all 9's has not been reached, readout is effected with the switches 29 changed over under the control of a bistable polarity flip-flop 34 to complement the digits, the digit actually read out being treated as a negative reading. All 9's reads as zero and thereafter readout is effected with the switches 29 reset to the illustrated position by the flip-flop 34 to give a true digit.

Reset arrangements can be adapted as required. If the switch 20 is open, the counter will eventually be cleared. The counter can then be reset to N/2 by applying rapid rest pulses to a terminal 35 connected to the clock input 15 of the stage $10_1$ through an AND gate 36, the switches 14 being restored to the counting configuration. The other input of the AND gate 36 is coupled to the output 11 of the stage $10_p$ through an inverter 37 and as soon as the stage $10_p$ goes to all 1's the gate 36 will be disabled.

Two counters as shown in the Figure can be used in combination in the same apparatus, in which case the contents of one counter can be transferred to the other in the shift mode by connecting the output 11 of the stage $10_p$ of the one counter to the input 12 of the stage $10_1$ of the other counter, the shift pulses being applied synchronously to the two counters.

I claim:

1. A multi-stage counter comprising a plurality $p$ of cascaded stages, each stage being constructed to count one digit in a number system of radix $n$ where $n$ is greater than 2, each counter stage having a plurality $m$ of binary circuits; circuit means for selectively interconnecting said plurality of stages as one of a multi-stage counter and a binary shift register, said circuit means including switch means for changing the configuration of said binary circuits from that composing the multi-stage counter to that of a binary shift register comprising the binary circuits and back, means for applying shift pulses to the stages in the shift register configuration and, in response to successive groups of $m$ shift pulses, for shifting the counted digits through the said stages, and means for effecting dynamic readout of the digits as they are shifted one by one into said one stage.

2. A multi-stage counter according to claim 1, comprising means for connecting said shift register as a recirculating register.

3. A multi-stage counter according to claim 1, wherein each counter stage is a decade stage consisting of a five-bit shift register connected in Johnson ring configuration.

4. A multi-stage counter according to claim 1, wherein the means for effecting dynamic readout comprise an $n$-line data highway and a decoder connected between the $m$ circuits of said one stage and said highway.

5. A multi-stage counter according to claim 4, wherein the means for effecting dynamic readout includes means for switching the connectings between the $m$ circuits of said one stage and the decoder to a complementary configuration to perform complementary decoding.

6. A multi-stage counter according to claim 1, further comprising position counter means for counting down the shift pulses by a factor of $m$ and for energizing $p$ position lines in succession in response to the successive groups of $m$ pulses.

7. A multi-stage counter according to claim 6, wherein the position counter means comprises a $p$-stage ring counter and a divide-by-$m$ circuit preceding the ring counter.

* * * * *